US009633021B2

(12) United States Patent
Caruso et al.

(10) Patent No.: US 9,633,021 B2
(45) Date of Patent: Apr. 25, 2017

(54) SOCIAL MEDIA CONTENT MANAGEMENT SYSTEM AND METHOD

(71) Applicant: BUNDLEPOST LLC, Cheyenne, WY (US)

(72) Inventors: Robert M. Caruso, Newberg, OR (US); Everett Steele, Vancouver, WA (US)

(73) Assignee: BUNDLEPOST LLC, Cheyenne, WY (US)

( * ) Notice: Subject to any disclaimer, the term of this patent is extended or adjusted under 35 U.S.C. 154(b) by 266 days.

(21) Appl. No.: 14/568,687

(22) Filed: Dec. 12, 2014

(65) Prior Publication Data

US 2015/0100586 A1 Apr. 9, 2015

Related U.S. Application Data

(63) Continuation of application No. 13/360,541, filed on Jan. 27, 2012, now Pat. No. 8,943,054.

(60) Provisional application No. 61/438,147, filed on Jan. 31, 2011, provisional application No. 61/441,600, filed on Feb. 10, 2011.

(51) Int. Cl.
   G06F 7/00       (2006.01)
   G06F 17/30      (2006.01)
   G06F 17/27      (2006.01)

(52) U.S. Cl.
   CPC ...... *G06F 17/3007* (2013.01); *G06F 17/2705* (2013.01); *G06F 17/3089* (2013.01); *G06F 17/30097* (2013.01)

(58) Field of Classification Search
   USPC ...... 705/14.41, 26.1, 30; 707/827, 100, 540, 707/722; 715/202; 711/118; 709/225
   See application file for complete search history.

(56) References Cited

U.S. PATENT DOCUMENTS

| 5,940,847 A | 8/1999 | Fein et al. |
| 8,332,392 B2 | 12/2012 | Brzozowski et al. |
| 2007/0245020 A1 | 10/2007 | Ott, IV |

(Continued)

OTHER PUBLICATIONS

Sadler, Stephen, Social Media Campaign System, Jun. 2, 2010, U.S. Appl. No. 61/350,720.
Bundlepost.com; printed on Sep. 17, 2014.

*Primary Examiner* — James Trujillo
*Assistant Examiner* — John J Morris
(74) *Attorney, Agent, or Firm* — Marger Johnson

(57) ABSTRACT

A social media content management system coupled to a social media network includes database files and execution instructions to assemble, manage and transmit social media content. The database files store a feed content file, a social content management file, and management tables including a schedule file and an export content file. Execution instructions include a feed channel content system for receiving and storing feed content items in the feed content file. A selection subsystem is used for selecting and storing export content as social media posts in the social content management file A scheduling subsystem enables a user to create and store schedules, to select a schedule and to merge the selected schedule with the stored content in the management file to form the export content file. An export system transmits the stored content as social media content posts to the social media network according to the selected schedule.

19 Claims, 25 Drawing Sheets

(56) References Cited

U.S. PATENT DOCUMENTS

| | | |
|---|---|---|
| 2008/0162507 A1 | 7/2008 | Papaioannou et al. |
| 2009/0112928 A1 | 4/2009 | Hoyt et al. |
| 2009/0319449 A1* | 12/2009 | Gamon ............ G06F 17/30014 706/12 |
| 2010/0042910 A1 | 2/2010 | Manolescu et al. |
| 2011/0040662 A1 | 2/2011 | Kurtzig |
| 2011/0112899 A1* | 5/2011 | Strutton ................ G06Q 30/02 705/14.41 |
| 2011/0320715 A1 | 12/2011 | Ickman et al. |
| 2012/0066082 A1* | 3/2012 | Sadler ................ G06Q 30/0277 705/26.1 |

* cited by examiner

Bundle Post

Merge Content/Schedule ✖

What Merge Option would you like to perform?
◉ Merge Content ○ Hashtag It ○ Merge Schedule ○ Export Select from the list:

```
Select One                                          ▼
Merge another Feed Channel Data into this Feed
Merge some of My Social Content into this Feed
Merge some of my Follow Friday Posts into this Feed
```

Select from the list:

```
Select One                                          ▼
My Personal Social Content
Client - Huber's Social Content Posts
Client - ABC Retail's Content Posts
Social Media General Content Posts
```

Drag & Drop Posts into your Feed Data: ▼

| Post Name | |
|---|---|
| ◀ YouTube Channel | Did you know we have a YouTube Channel with helpful videos?<br>http://www.youtube.com/VickiNorrisOrganizer |
| ◀ Client Website | We have recently upgraded our website w/ newsletter, products and my<br>http://restoringorder.com/ |
| ◀ Client Product 1 | Now you can get my Paper Management series on DVD!<br>http://www.restoringorderstore.com/Products.aspx?catid=17 |

| Move | Content Folder Name | Created | Records | | |
|---|---|---|---|---|---|
| | My Personal Social Content | Jan. 1, 2011 | 88 | | |
| ▲ | Client - Huber's Social Content Posts | Jan. 1, 2011 | 129 | | |
| ▲ | Client - ABC Retail's Content Posts | Jan. 1, 2011 | 71 | | |
| ▲ | Social Media General Content Posts | Jan. 1, 2011 | 2 | | |

Add a Social Content Folder
Create a Name for your new Social Content Folder Save/Create Social Folder Information ✖

About Social Content Folders

This is the page where you create folders that can house specific posts that link to other social content you would like to database and easily merge into scheduled bulk posts.

This feature allows you to warehouse those specific posts to your website, videos, blog and other shareable content you need to consistently add into your Twitter/Facebook streams.

This is escpecially helpful for those managing several client accounts or who have a large amount of external content that you would like to merge into bulk scheduled posts.

Click the 🌐 button to add a new Social Content Folder & the ⌐ button to view/edit the posts in that folder.

| System/Function/Page | Type | Details |
|---|---|---|
| Channel Management Add/Edit/Delete Google Alerts/Rss | User | This allows users to View/edit/create Google Alerts or RSS Channel Feeds that they wish to connect Info Bundle Post. They should be able to create a Channel Title, enter the Alert or Feed link and save. Each Channel created will link to the "Feed Data" from that channel in a one to many relationship. So clicking to view data for the first Channel the user created will take them to a screen where they are shown how many records are available and each record listed 1-how ever many there are. The Title Text will be displayed in an editable field and a link to open the web page that the record is connected to will be provided. |
| Feed Data - View/Edit/Delete | User | So clicking to view data for the a Channel (above) the user created will take them to a screen where they are shown how many records are available and each record listed 1-how ever many there are. The Title Text will be displayed in an editable field and a link to open the web page (In a new tab) that the record is connected to will be provided. Title Text fields which contain either a) more than 115 characters and/or b) the text characters " or ' or – or % need to be highlighted for required editing by the user. |
| Hashtag Channels List View/Add/Edit/Delete | User | Similar to Channels, The user should be allowed to create a Hashtag Channel, name it and click to view/add/Edit/Delete data |
| Hashtag Data View/Edit/Delete | User | Once clicking on a specific Hashtag channel, the user should be able to list keywords (comma separated) in a field and save. Upon saving that Hashtag Channels data, the system will parse those keywords into separate fields that the user can edit/delete each at a later time. |
| Custom "My Social Content" View/Add/Edit/Delete | User | Identical functions as Hashtag channels above |
| Content Posts View/Edit/Delete | User | Once clicking on a specific "My Social Content" channel, the user should be able to create specific text and link records for that specific Social Content Channel one at a time. Each channel record will contain text and link fields. Upon saving a Social Content Channel record, the user can edit/delete each at a later time. |
| Follow Friday Lists View/Add/Edit/Delete | User | Identical functions as Hashtag and My Social Content channels above |
| Follow Friday Posts View/Edit/Delete | User | Once clicking on a specific Follow Friday channel, the user should be able to create specific text and link records for that specific FF Channel one at a time. Each channel record will contain text and link fields but links are not required to save the record. Upon saving a FF Channel record, the user can edit/delete each at a later time. |
| User Schedule Time View/Add/Edit/Delete Database | User | Similar to above Channels, here a user will create a new Schedule, name it and save. |
| Schedule Data View/Edit/Delete | User | Once clicking on a specific Schedule channel, the user be asked for a start time for the first post each day and an end time for the last post each day, as well as the interval for each post (every 15, 30, 45, 60, 90 minutes). The system will automatically create a time template for that schedule based on what the user answers. All times should be in hh:mm format |
| Admin – User/Subscription Mgmt & Reporting | System | Initially the system will allow administrators to search user records, edit user settings, subscriptions, user types (i.e. make a user an admin) and view the users original subscription date, see subscription payment issues, make notes for a user for tech support issues, etc. Additional reporting and management functions will be added later under different development projects |
| Merchant Account Ecommerce Integration Mo. Subscribe Billing | System | Automated integration of PayPal Pro Merchant account credit card and PayPal monthly subscription billing. |
| Google Alert/RSS Feed Parcing/Databasing Feed Data | System | The back end system that connects to Google Alert and/or RSS feeds and parses the data into database fields for use with above user page/database functions. |
| Schedule Date/Time Merge System | System | The back end system that merges a user created Schedule channel with a 1,2,3 or 4 day date range to available Channel data records they wish to export to CSV. |
| Auto-Hashtag System Merged to Content | System | The back end system that automatically takes a selected Hashtag Channel data (keywords), searches and adds hastags (#) to those keywords to text fields of available Channel data records they wish to export to CSV |
| Follow Friday System Merge to Content | System | The back end system that allows a user to insert specific Follow Friday posts from a selected Follow Friday List Channel into available Channel data records they wish to export to CSV |
| Custom Social Content Merge to Content | System | The back end system that allows a user to insert specific My Social Content posts from a selected My Social Content List Channel into available Channel data records they wish to export to CSV |
| CSV Export System | System | Once the user has merged Follow Friday, Custom Content posts and edited all the Channel Record data as desired and is ready to export that specific Channels Records, they should be given an option to export to CSV. The user will be asked to select a saved schedule and be asked for a 1,2,3 or 4 day date range for the export.<br><br>The export will send out three fields ONLY w/o column headers, in the following order:<br><br>1) Date/Time (in dd/mm/yyyy hh:mm format)<br>2) Header/Post Text<br>3) Data Record web link (requires http:// not just www)<br><br>Export the file to a CSV for the user to save on their PC. ***Max records per export is 50 |

FIG. 15B

| Folder Name Here | | |
|---|---|---|
| ID | Title | Text | URL |
| 1 | Our Fanpage | Check out our Facebook Page! | http://facebook.com/pageurl |
| 2 | YouTube | Did you know we have a YouTube Channel? | http://sampleURL.com |
| 3 | Website | Our latest menu is on our website. Do you like steak? | http://sampleURL.com |
| 4 | Band Video | Did you see the band at the Restaurant last weekend? | No url saved |

FIG. 20A

| Follow Friday Folder Name Here | | |
|---|---|---|
| ID | Title | Text | |
| 1 | Our Fanpage | Check out our Facebook Page! | |
| 2 | YouTube | Did you know we have a YouTube Channel? | |
| 3 | Website | Our latest menu is on our website. Do you like steak? | |
| 4 | Band Video | Did you see the band at the Restaurant last weekend? | |

FIG. 20B

SOCIAL MEDIA CONTENT MANAGEMENT SYSTEM AND METHOD

RELATED APPLICATION DATA

This application is a continuation of U.S. patent application Ser. No. 13/360,541, filed Jan. 27, 2012, now U.S. Pat. No. 8,943,054, which claimed the benefit of U.S. provisional patent application Ser. No. 61/438,147, filed Jan. 31, 2011 and Ser. No. 61/441,600, filed Feb. 10, 2011, herein incorporated by reference.

BACKGROUND OF THE INVENTION

One of the most time consuming tasks within social media is searching, finding, reviewing, editing, scheduling and posting relevant content (articles, blogs, reports, new web pages, etc.) that will be valuable to your targeted social media audience. Taking the time to consistently post quality content daily to ensure no matter when your audience is logged into a particular social media platform you are posting to, is an important factor to building relationships, providing value and social media success.

Furthermore, it is important to infuse content that talks about YOU, your brand, products and services into the social stream. Remembering the different social content, sites and platforms your social accounts represent, as well as remembering to post that content, is another big challenge facing social marketers.

In addition, taking the time and/or remembering to hashtag the text of your posts to Twitter is something we either often forget, don't have the time to do consistently, or don't remember the keywords we should be hashtagging in our posts.

These are some of the needs that the Social Media Content Management System and Method address.

SUMMARY OF THE INVENTION

There are several aspects to the present invention:

1) Social Content Management System—The first system designed to database preformatted posts for including, but not limited to a company's website, video's, fanpage and any other content a company would want to post and share within the social media space.

2) Automated method of databasing, formatting and editing content specifically for social media posting, including but not limited to Google Alerts, RSS Feeds, Imported data, etc.

3) Automated text content hashtags—System that allows user to database keywords and assign replacement hashtag text that will automatically search social media content text within a databased environment and replace the keywords with desired Hashtags.

4) A system and method for aggregating large amounts of social media content posts, including but not limited to text, links, images and video, then merging the multiple edited posts with a preformatted time schedule, resulting in pre-scheduled social media posts over several days possible. Additionally, the prescheduled posts are automatically assigned date ranges and can be exported into one of many formats, including but not limited to text, CSV, etc.

The Social media content management system and method of the present invention significantly reduces the time required for finding, reviewing, editing, scheduling and posting relevant content by automatically pulling Google Alert search terms and RSS feed content directly into a database with headings, links and descriptions, ready for posting to social media accounts. This content can be reviewed, edited, grouped and appended with date/time posting schedules that then can be exported and immediately uploaded into a social media management system, such as HootSuite, for bulk posting.

The Social media content management system also provides the ability to automatically merge hash tags into the text content of your posts. Users can create lists of pre-selected key words as well as the desired replaced hashtags. Bundle Post automatically finds and replaces the keywords with the hashtags, delivering more effective posts, in a lot less time.

Social media content management is the first system with the capability to database and merge all web, video and social content along with desired #FollowFriday posts and insert them into an exportable file format. Having your personal social content posts already databased and ready ensures you don't forget to post your brand related content into your daily feeds.

Using the Social media content management system can cut approximately 80 percent of the back office workload required, making social media management more effective for organizations of any size. Additionally, businesses have the potential to realize increased profitability as a result of the efficiencies the technology delivers, allowing more time for engaging with fans and followers.

The foregoing and other objects, features and advantages of the invention will become more readily apparent from the following detailed description of a preferred embodiment of the invention that proceeds with reference to the accompanying drawings.

BRIEF DESCRIPTION OF DRAWINGS

FIG. 2A is a screen print of an example of a content feed from email and FIG. 2B shows an alternative form of content feed from an RSS/XML Google Alert, either of which can be used as an input in the present invention.

FIG. 4 is a screen print of an example of a feed channel management screen for displaying example feed channels for selection, editing and management or deletion by a user for edit system according to a commercial embodiment of the invention of FIG. 3.

FIG. 5 is a screen print of an example data feed selected from the feed channels screen of FIG. 4, wherein the user can edit or delete the text of a post of the feed and view the URL associated with each post in the feed.

FIG. 6 is a screen print of an example of a merge content/schedules screen for the embodiment of FIG. 3.

FIG. 7 is a screen print of a repository of proprietary social content folders screen for the My Social Content repository accessed on the Dashboard in the embodiment of FIG. 3.

FIG. 8 is a screen print of an example social content management folder screen showing posts selected from the social content folders screen of FIG. 7.

FIG. 9 is a screen print of an example of a social content hashtag lists screen that can be accessed from the Dashboard in the embodiment of FIG. 3.

FIG. 10 is a screen print of an example hashtag list selected from the screen of FIG. 9.

FIG. 11 is a screen print of a schedules lists screen showing titles for various schedules that can be accessed via the Bulk Schedules tab in the Dashboard preferences in the embodiment of FIG. 3 and can be added, managed or deleted per the user's preferences.

FIG. 12 is a screen print of an example schedule times list created under or selected from the screen of FIG. 11.

FIG. 13 is a screen print of an example of a lists screen for personalized postings (called "Follow Friday" posts in Twitter) accessed via the Follow Friday Lists tab in the embodiment of FIG. 3.

FIG. 14 is a screen print of an example screen of Follow Friday posts in one of the lists selected from the personalized postings screen of FIG. 13.

FIG. 15B is a table further detailing the operation of the blocks shown in FIG. 15A.

FIGS. 20A and 20B are examples of management tables used for assembling social media posts from social media content data feeds.

DETAILED DESCRIPTION

Overview of Social Media Content Management System

Figure 1:
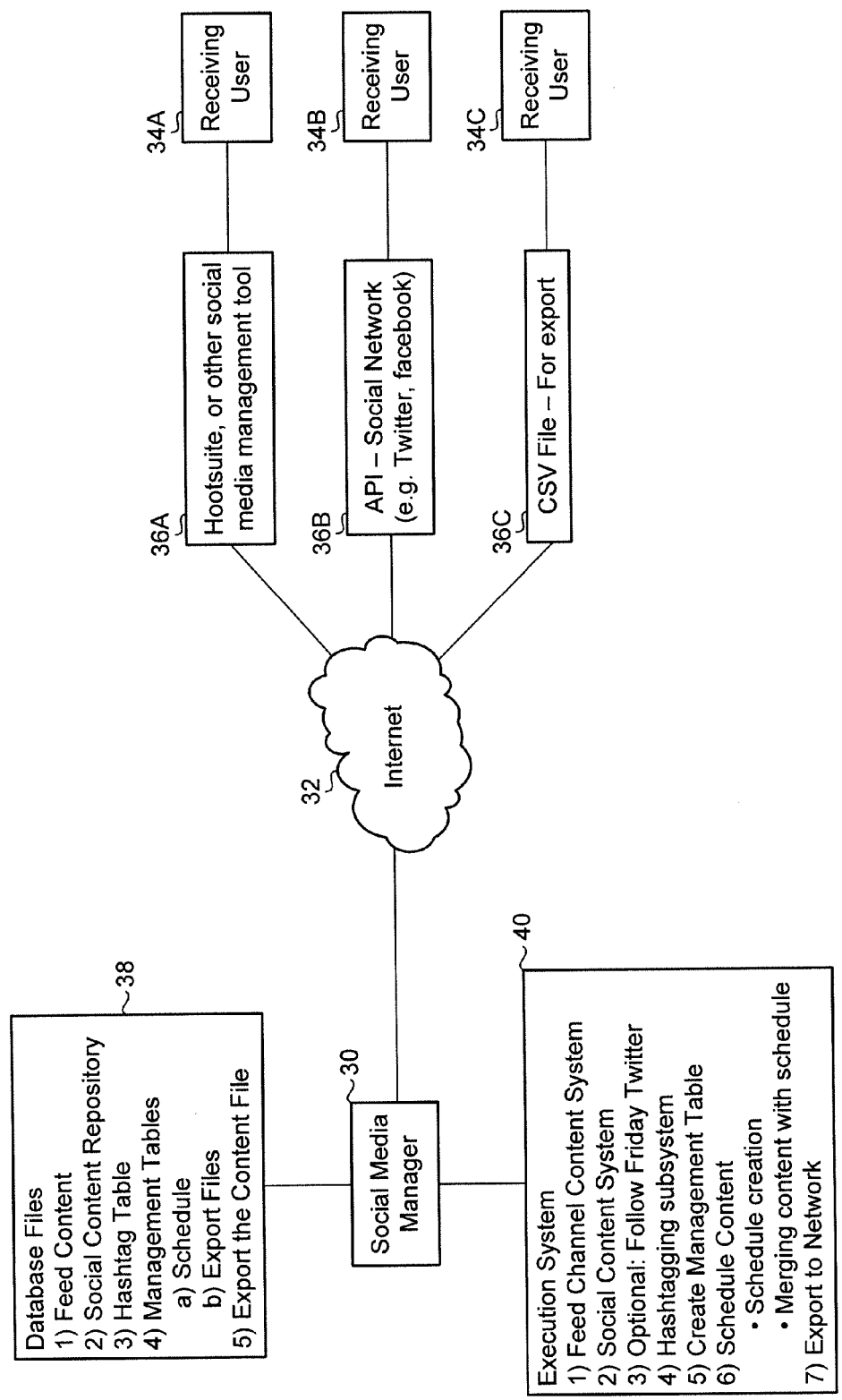
FIG. 1 is a block diagram of an embodiment of the Social Media Content Management System according to the invention.

FIG. 1 is a block diagram of an embodiment of the Social Media Content Management System. The system can be implemented on a stand-alone computer or a local network of computers having a server coupled to multiple user computers, generally designated as Social Media Manager 30. The computer, or server, in Manager 30 includes a standard network interface with access to the Internet 32. Social media content posts can be sent to Receiving Users 34A, 34B, 34C through different media formats 36A, 36B, 36C.

The Social Media Manager 30 computer(s) include conventional memory and processor hardware and operating system and browser software. Stored in memory are Database files 38 and executable code, referred to herein as the Execution System 40 for implementing an embodiment of the invention.

The last component of each of the Database files 38 and the Execution System 40 implement an export system for transmitting the content items stored in the export content file in different media formats 36A, 36B, 36C. The export system is operable to transmit content items in one or more of the following formats: direct connection to third party social media management applications (36A); an application program interface (API) connection to a specific social network or other API-functional application (36B); or as a text file, such as a comma separated value (CSV) text file (36C).

Figure 2A:
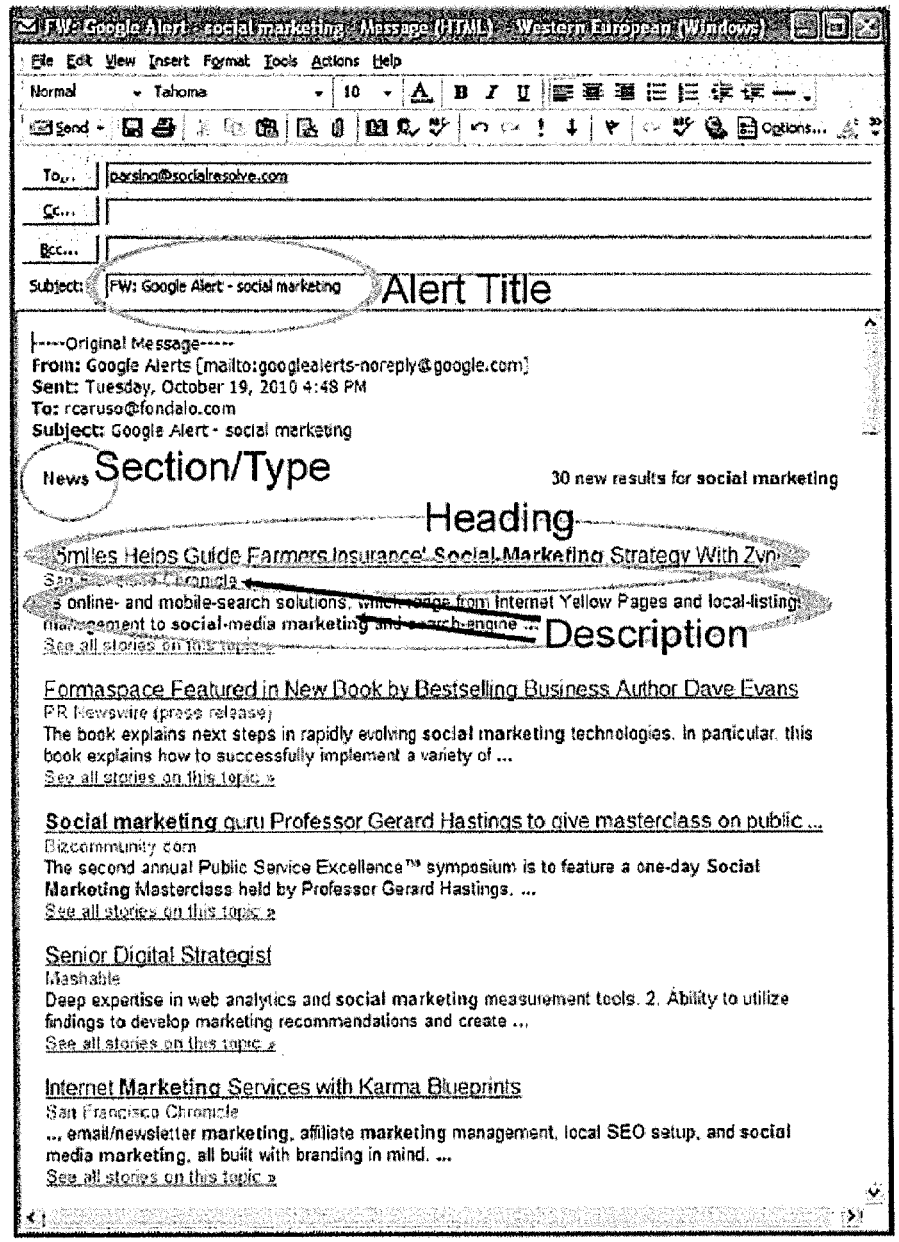

FIG. 2A is a screen print of an example of a content feed that can be used as an input in the present invention. This is an example of a Google Alert received as an email. An alternative form is an RSS/XML Google Alert feed, shown in FIG. 2B. Components of the Google Alert in FIG. 2A are annotated to identify an Alert Title, Section/Type, Heading (e.g., article title) and Description, which are used in classifying the source, the nature and components of the content, and a heading. A URL associated with each heading can be extracted from the RSS feed in FIG. 2B. These components are used in parsing the content feed, as described below.

Figure 3:
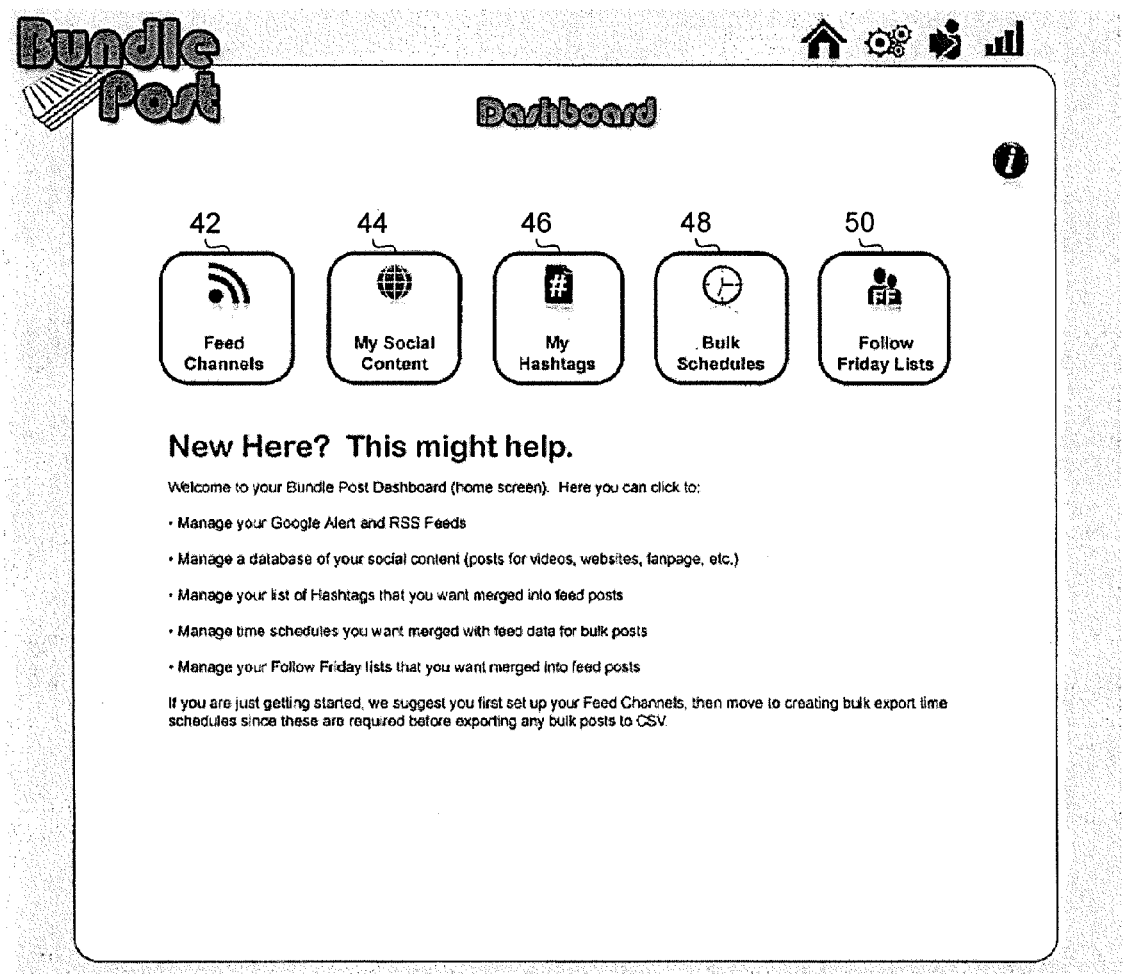
FIG. 3 is a screen print of an example of a main login or Dashboard screen for the Social Media Content Management System which allows the user to access different functions of the system according to a commercial embodiment of the invention of FIG. 1.

FIG. 3 is a screen print of an example of a main login or Dashboard screen for the Social Media Content Management System which allows the user to access different functions of the system according to a commercial embodiment of the invention of FIG. 1. The Dashboard in this example, which is particularly adapted for Twitter, provides the user with selection tabs to access different functions: Feed Channels 42, My Social Content 44, My Hashtags 46, Bulk Schedules 48 and Follow Friday Posts 50. This example is particularly adapted for Twitter, by providing hashtagging and Follow Friday Posts capabilities, but can readily be adapted to other social media such as Facebook wherein these capabilities are not conventionally used. User instructions appear in the bottom portion of this and each subsequent screen, which form a part of this description and are incorporated herein by this reference.

Figure 4:
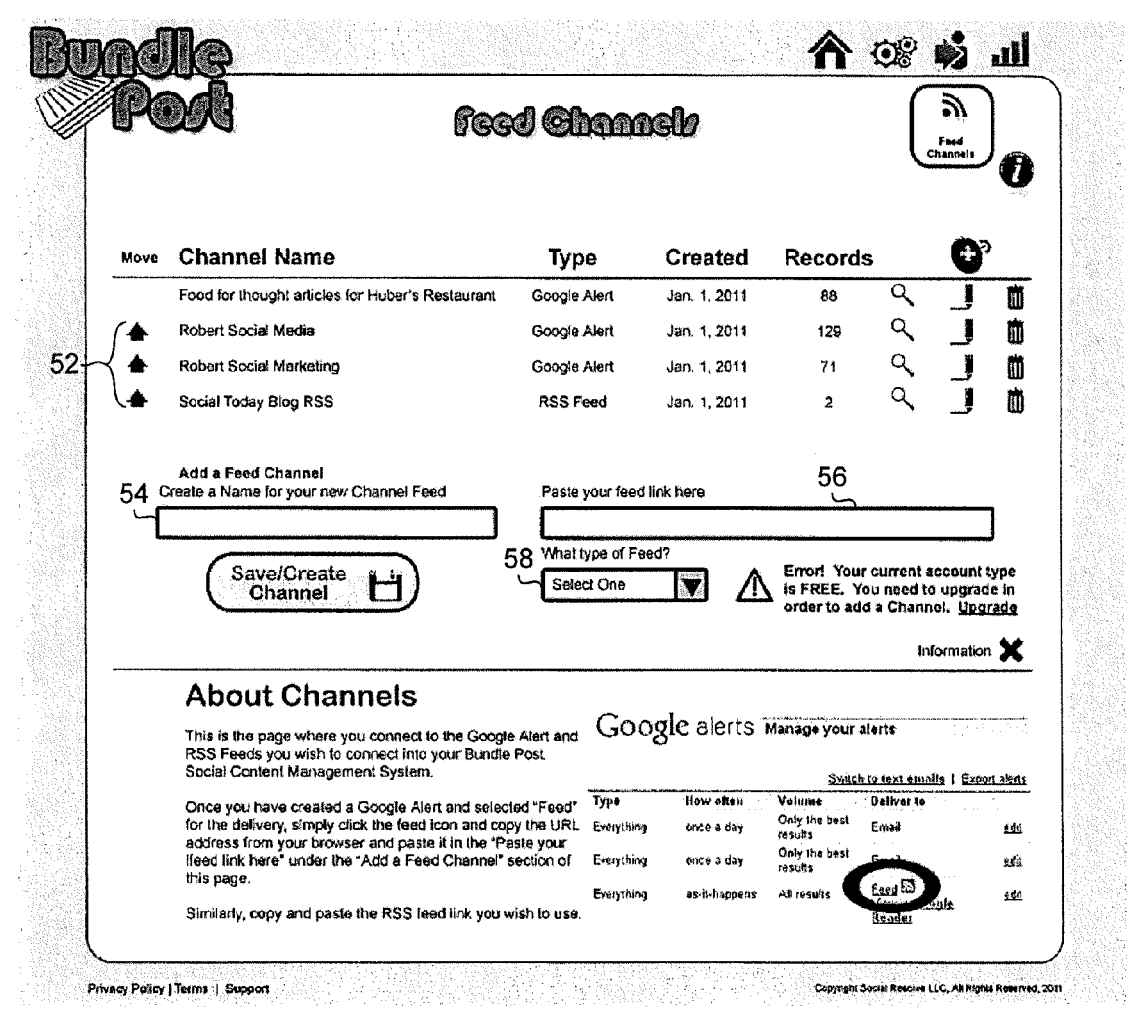

FIG. 4 is a screen print of an example of a feed channel management screen accessed via tab 42 in FIG. 3 for displaying example feed channels 52 for selection, editing and management or deletion by a user for edit. This screen enables the user to add a feed channel at box 54, identifying the feed link at box 56 and the type of feed at box 58.

Figure 5:
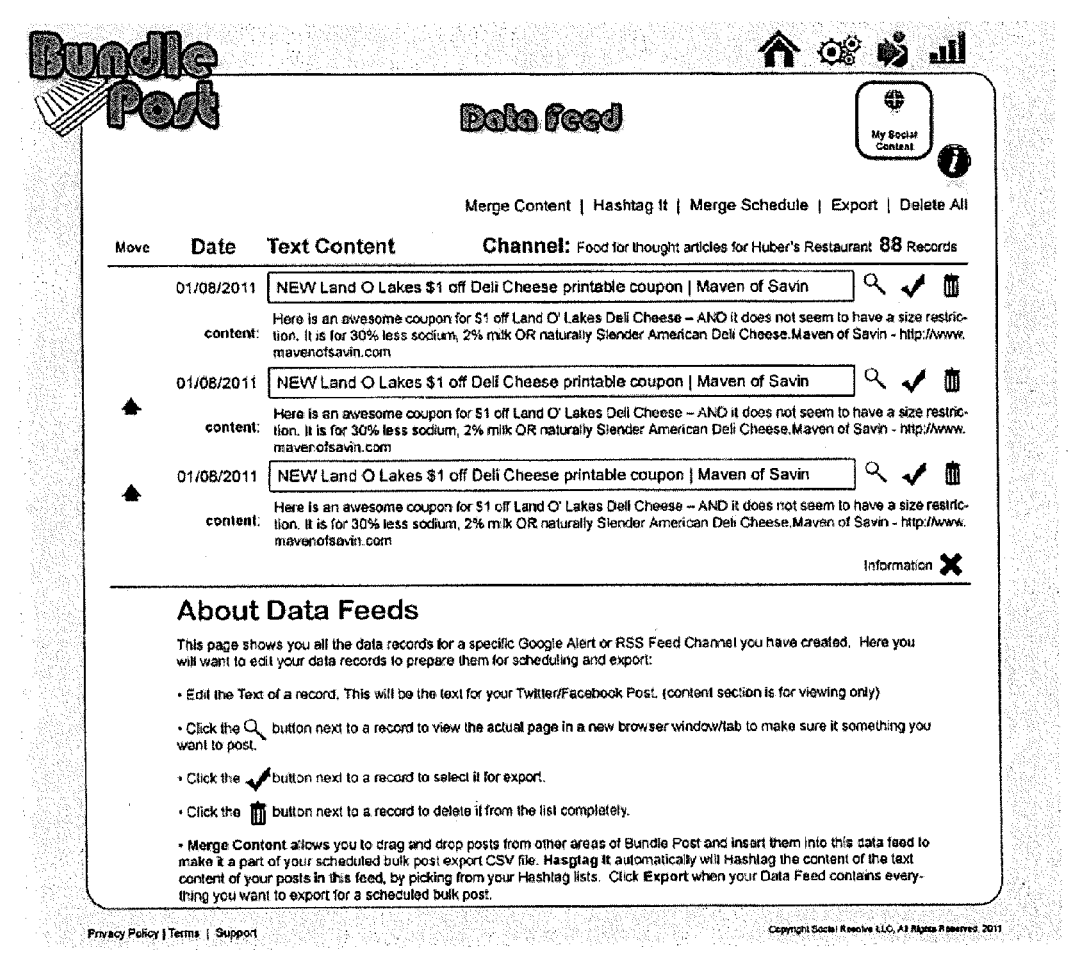

FIG. 5 is a screen print of an example data feed selected from the feed channels screen of FIG. 4. In this screen, the user can edit or delete the text of a post in the feed and can view the URL associated with each post in the feed.

FIG. 6 is a screen print of an example of a merge content/schedules screen for the embodiment of FIG. 3. This screen can be accessed, for example, from the Merge Content command in the Data Feed screen of FIG. 5.

FIG. 7 is a screen print of a repository of proprietary social content folders for the My Social Content repository accessed at tab 44 on the Dashboard in the embodiment of FIG. 3. The user can select and/or add a folder from this screen, which brings the user to a screen like that shown in FIG. 8. This screen displays an example social content management folder screen showing posts selected from the social content folders screen. These posts may be edited, deleted or hashtagged, as the user desires.

Figure 9:
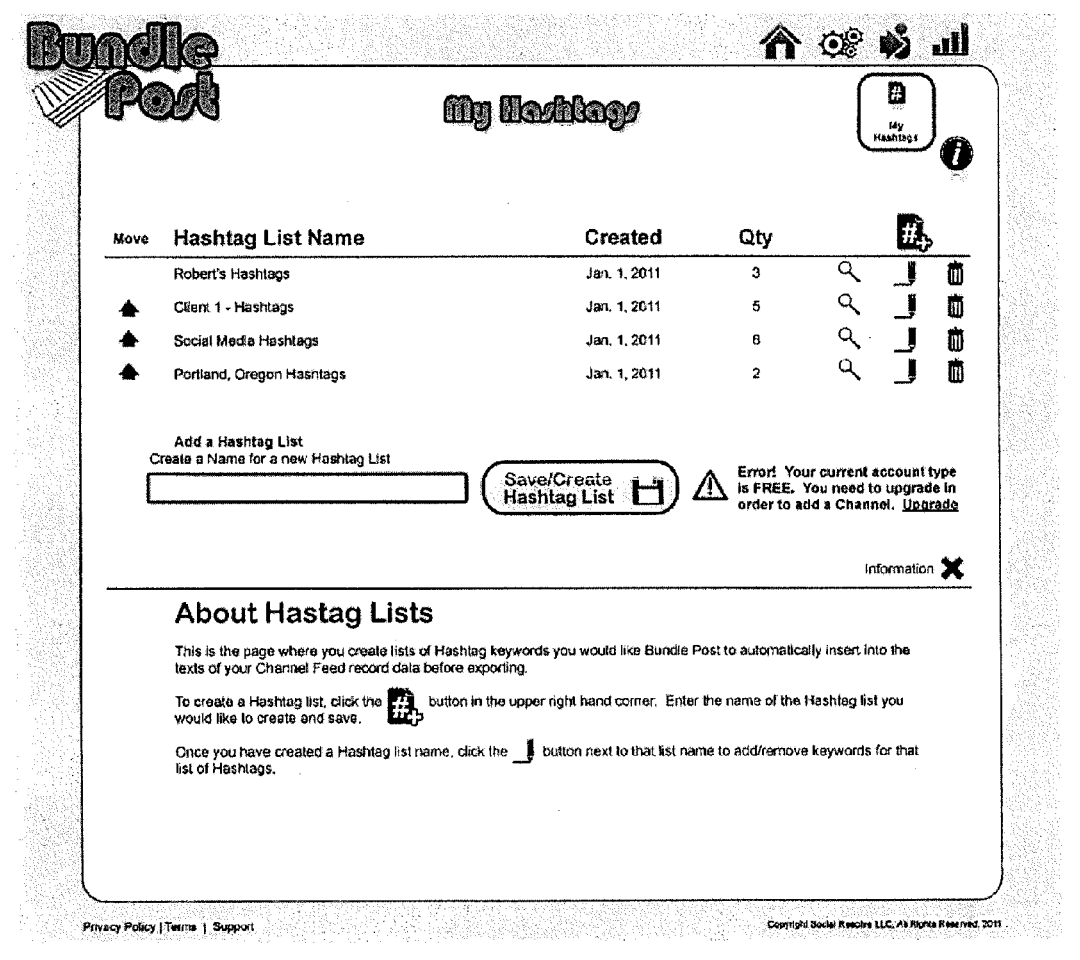
Figure 10:
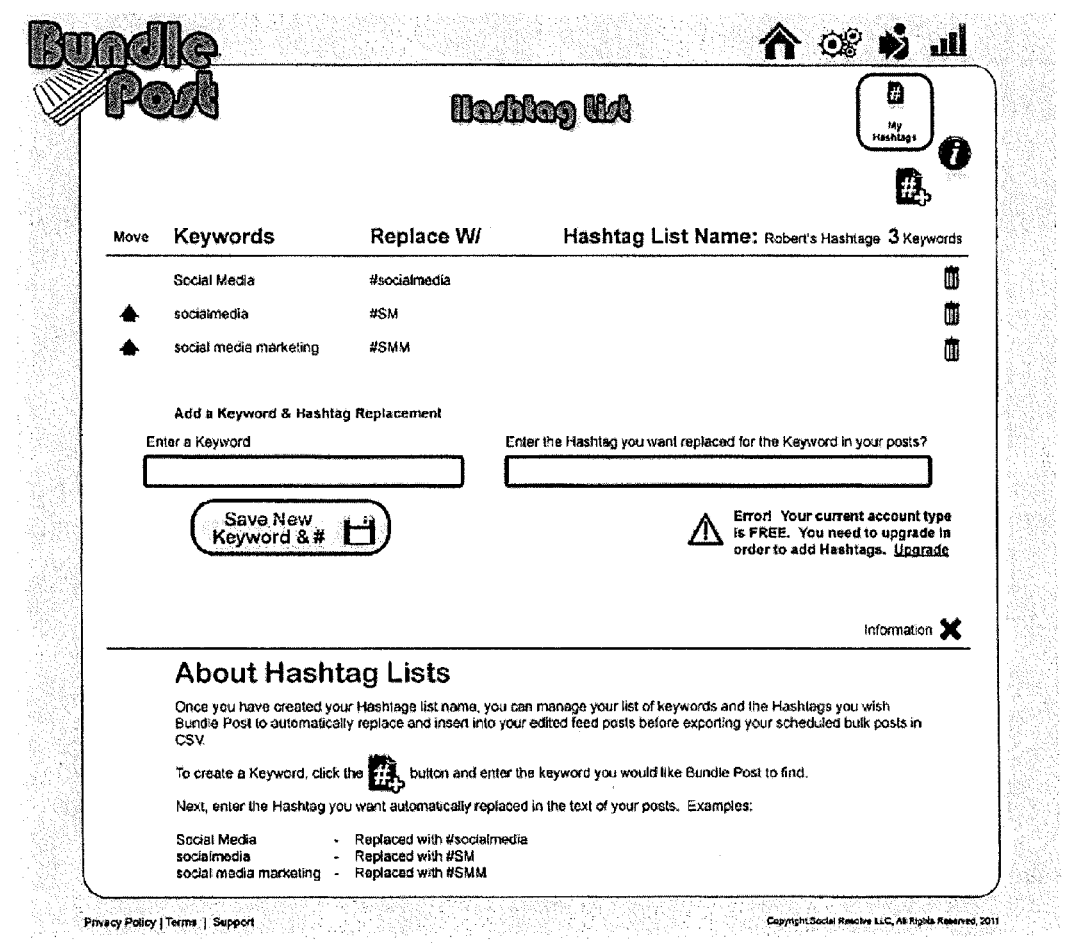

FIG. 9 is a screen print of an example of a social content hashtag lists screen that can be accessed from tab 46 in the Dashboard of FIG. 3. The user can keep multiple lists, or glossaries, of hashtags and the ordinary textual term that each hashtag corresponds to. An example of a hashtag list selected from the screen of FIG. 9 is shown in FIG. 10. The hashtags can be created, deleted or edited in the screen. In the export posts, the hashtags from this list are substituted for the corresponding ordinary textual term automatically.

Figure 11:
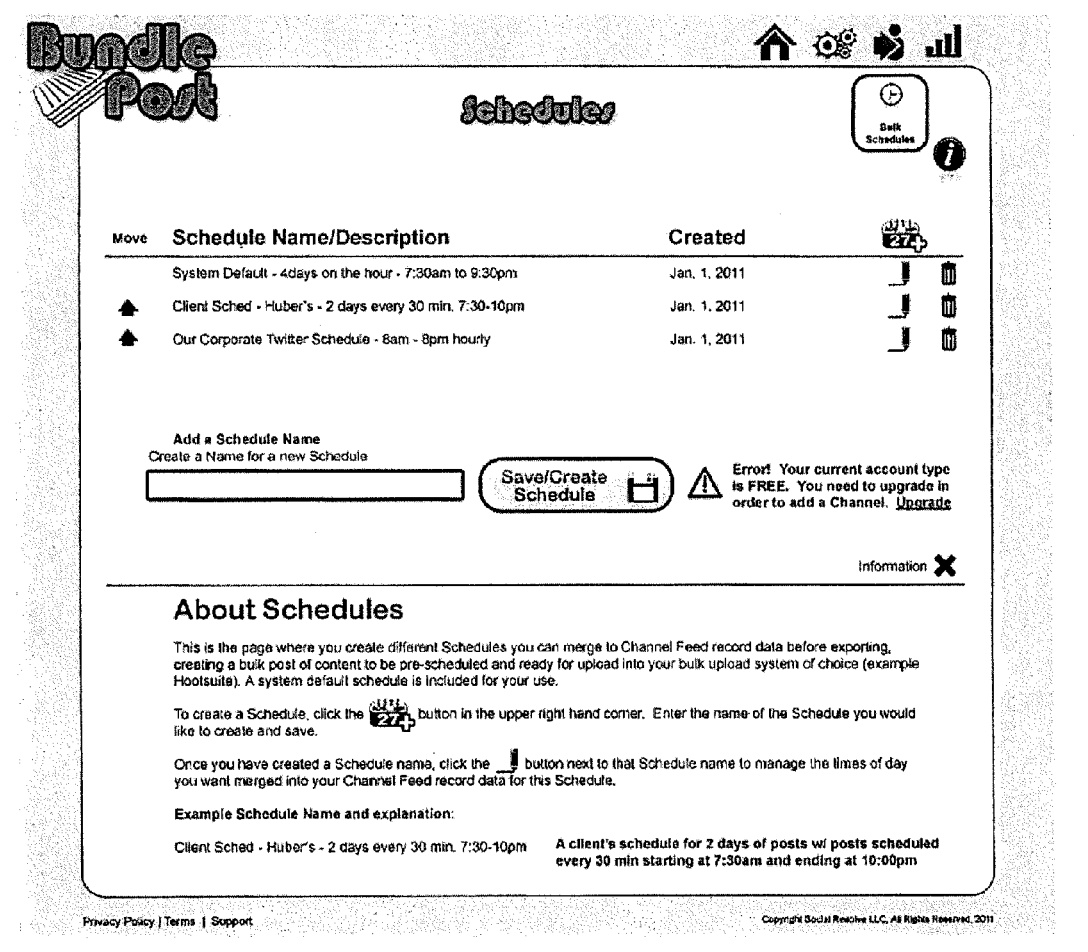
Figure 12:
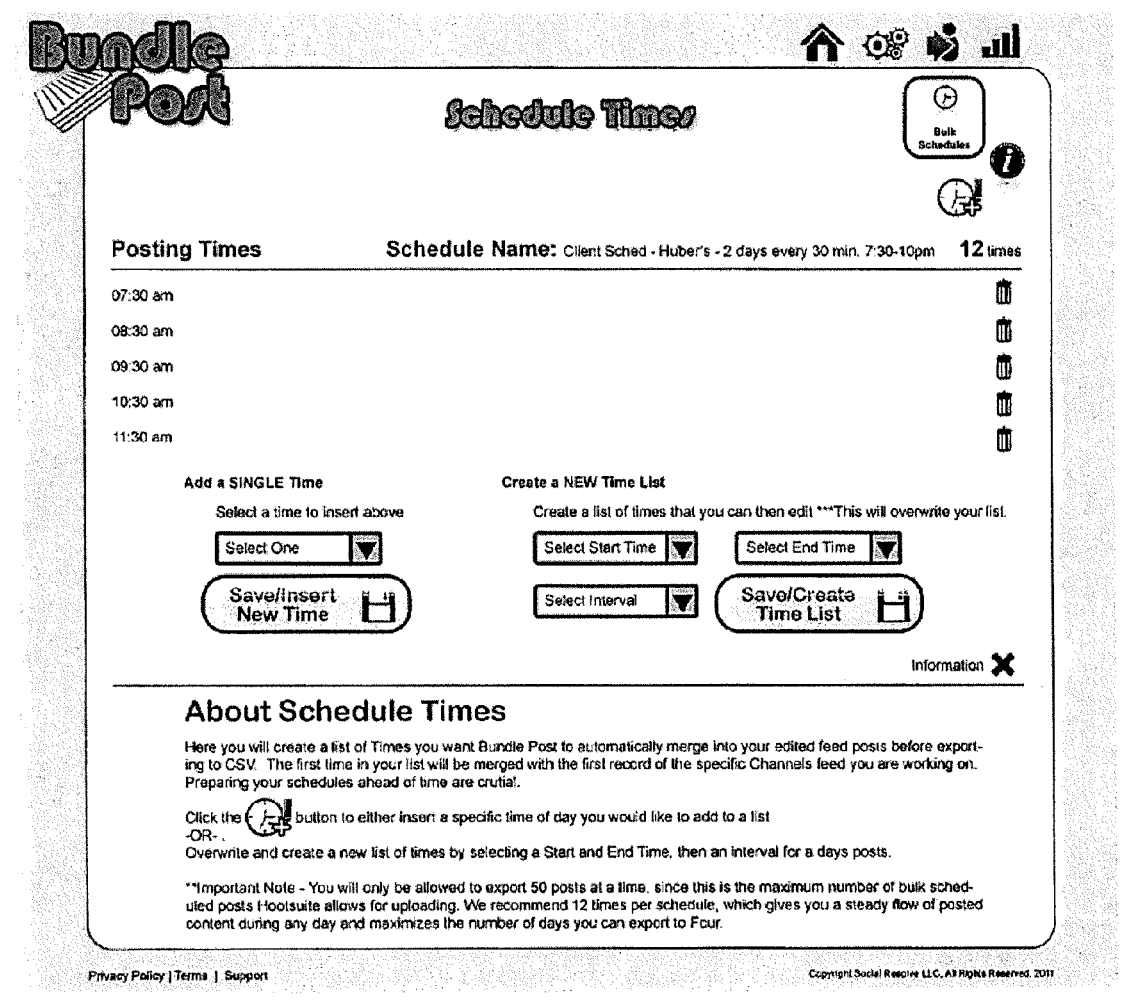

FIG. 11 is a screen print of a schedules lists screen showing titles for various schedules that can be accessed via the Bulk Schedules tab 48 in the Dashboard preferences in FIG. 3. The schedules can be added, managed or deleted per the user's preferences. FIG. 12 is a screen print of an example schedule showing a schedule times list created under or selected from the screen of FIG. 11. Tabs shown below the list enable the user to delineate start and end times for a schedule and a time interval for a new time list, or to insert a new time into a list.

Figure 13:
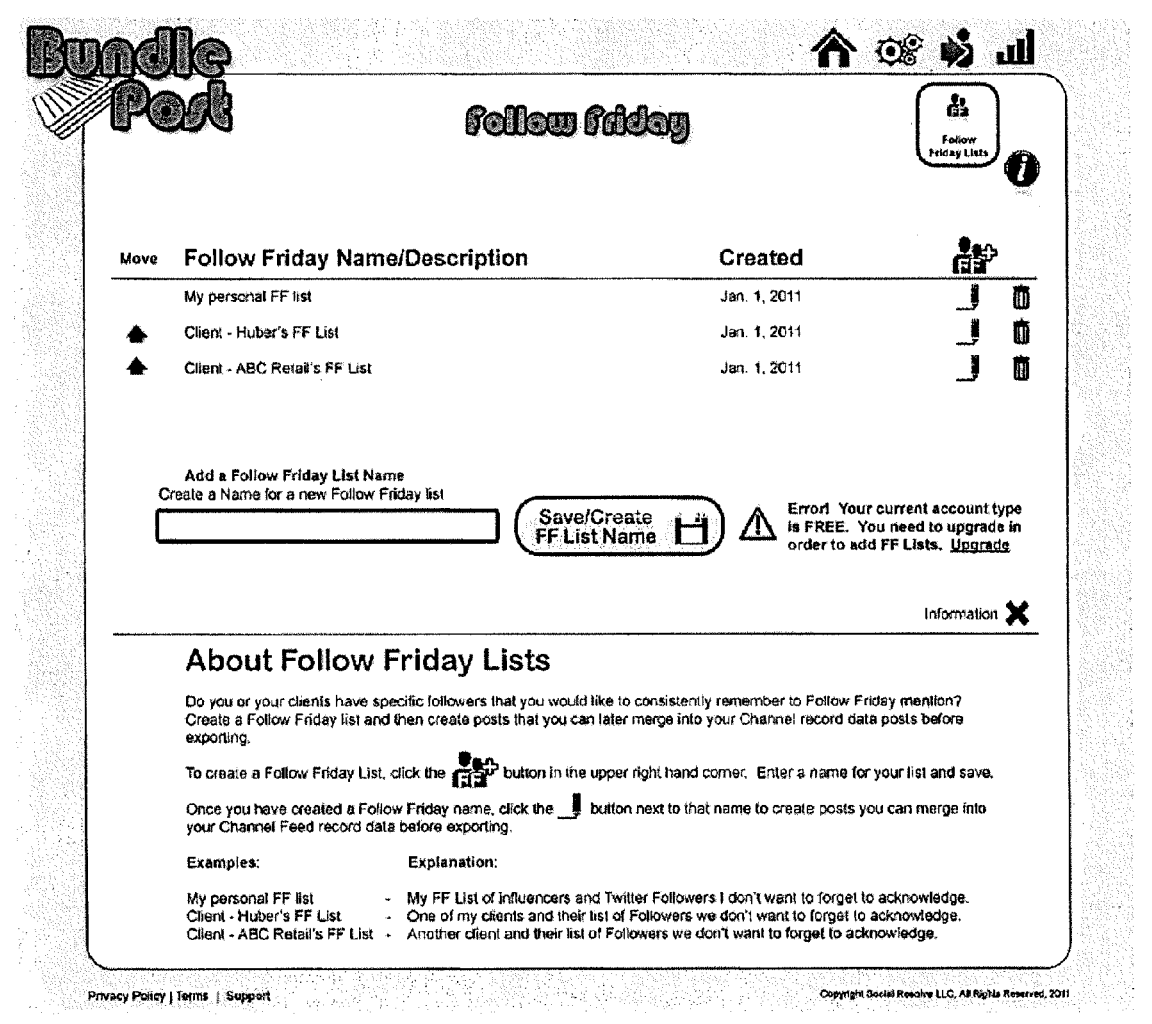
Figure 14:
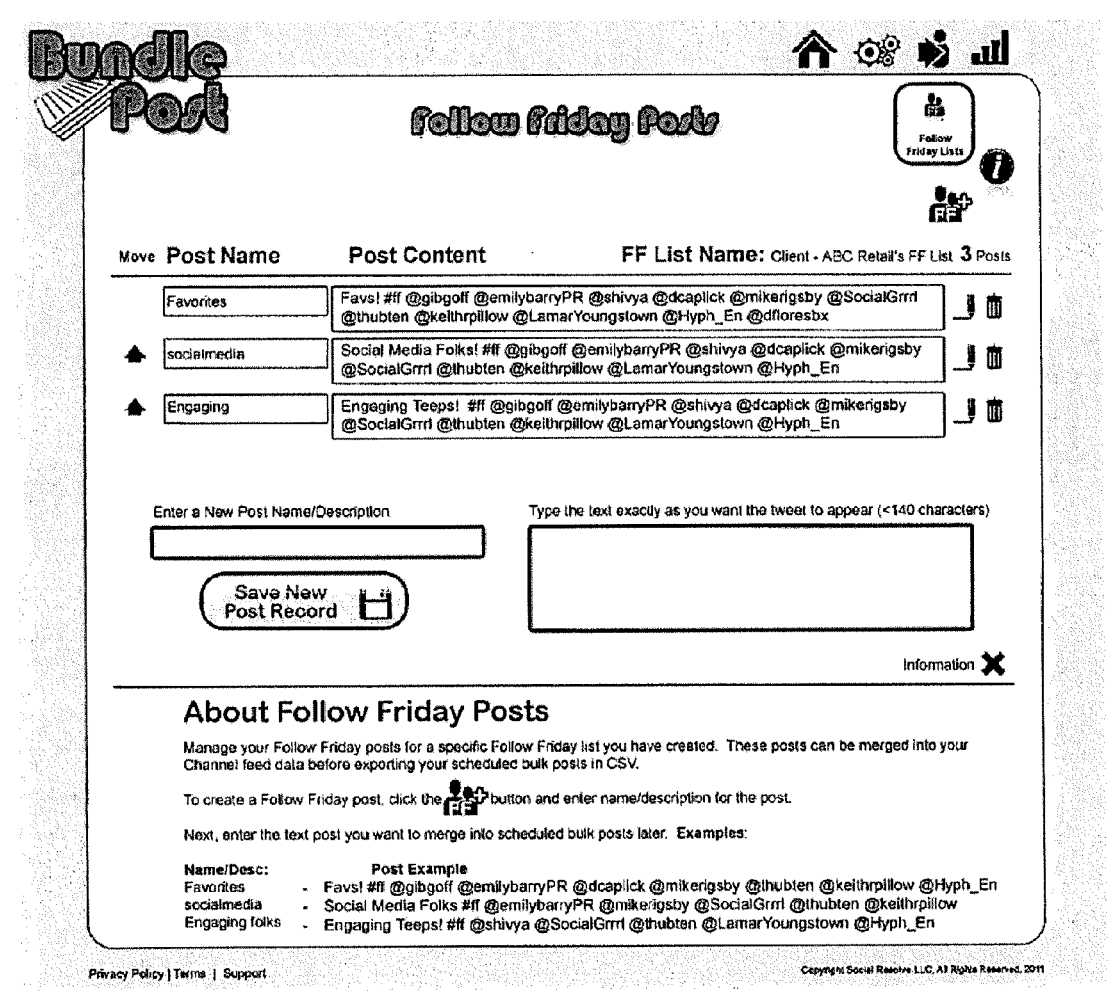

FIG. 13 is a screen print of an example of a lists screen for personalized postings (called "Follow Friday" posts in Twitter) accessed via the Follow Friday Lists tab 50 in the embodiment of FIG. 3. These lists will typically contain a repository of personalized posts to Twitter for various audiences. FIG. 14 is a screen print of an example screen of Follow Friday posts for one of the lists selected from the personalized postings screen of FIG. 13. The example posts show hashtags added from one of the hashtag lists of FIGS. 9 and 10.

Figure 15A:
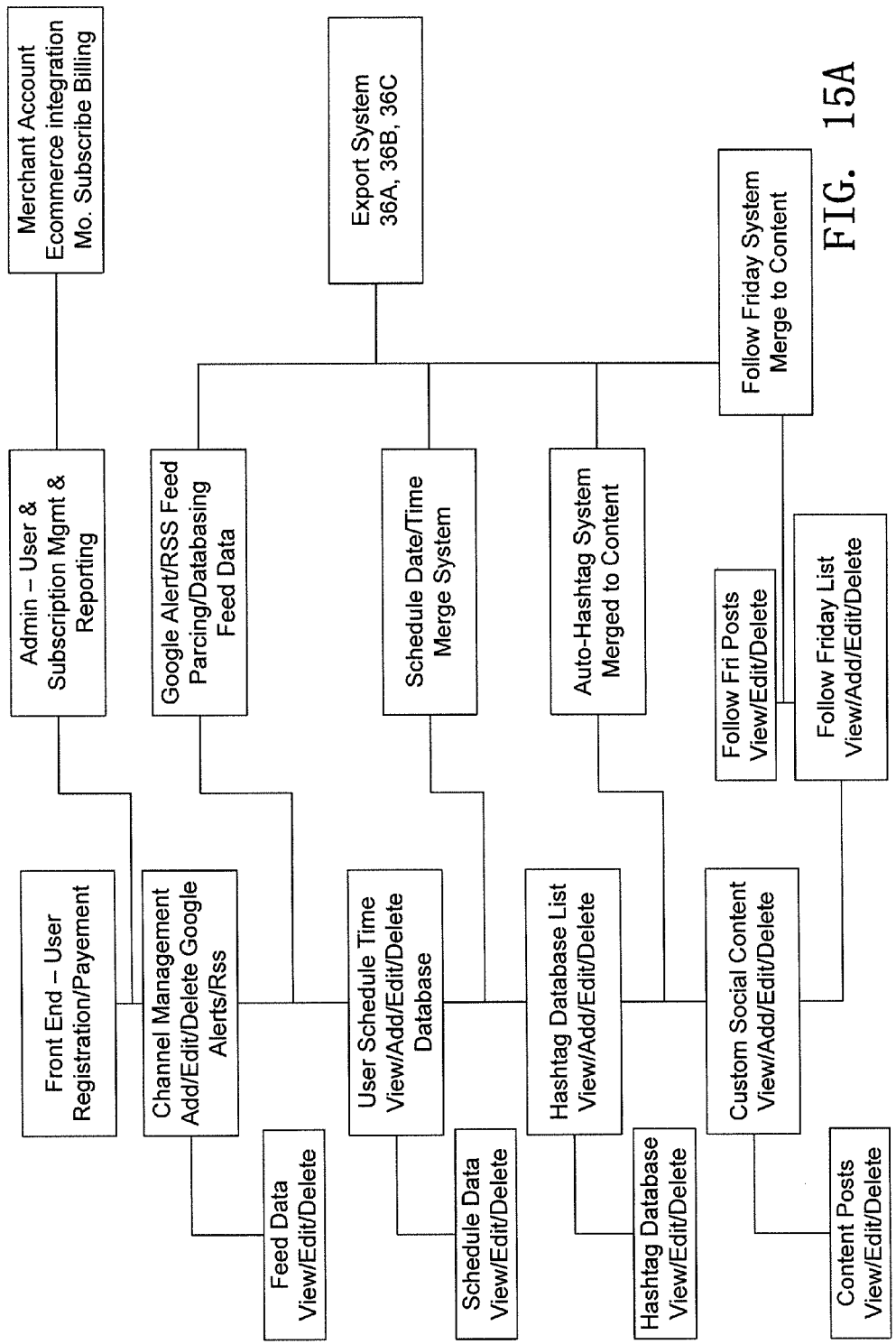
FIG. 15A is a block diagram showing an example structure for the database and executable systems for implementing a commercial embodiment of the system of FIG. 1

FIG. 15A is a block diagram showing an example structure for the database and executable systems for implementing a commercial embodiment of the system of FIG. 1 in software executable on the computer or network of the Social Media Manager 30. FIG. 15B is a table further detailing the operation of the software blocks shown in FIG. 15A. The description of the blocks and their operation as set forth in FIG. 15B provides an example of a presently preferred embodiment, and is incorporated herein by reference.

Automated method of databasing, formatting and editing content specifically for social media posting, including but not limited to Google Alerts, RSS & Atom Feeds, Imported text file data, etc. (feeds), as a repository system for all ingested or manually entered social media content posts.

Figure 2B:
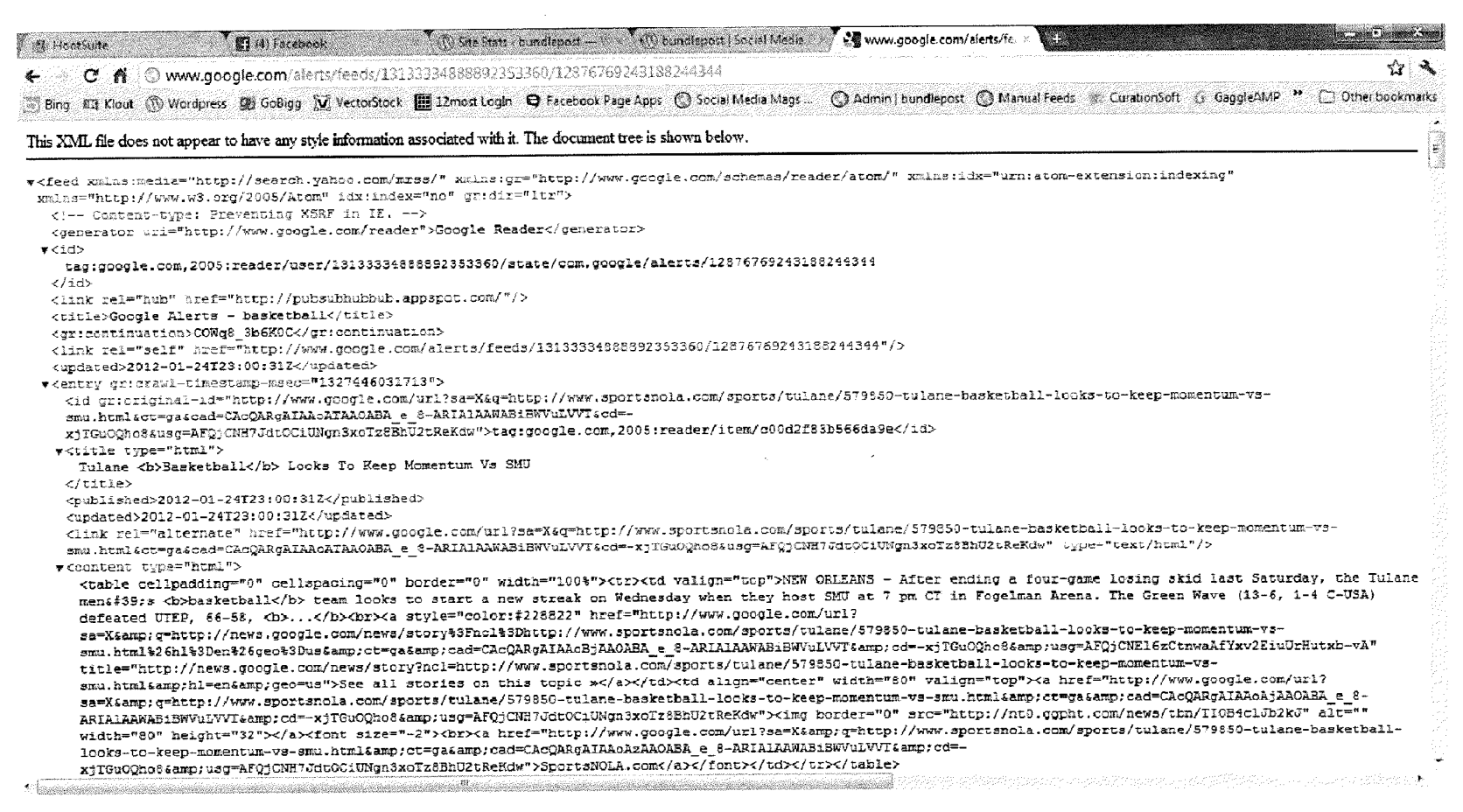
Figure 16:
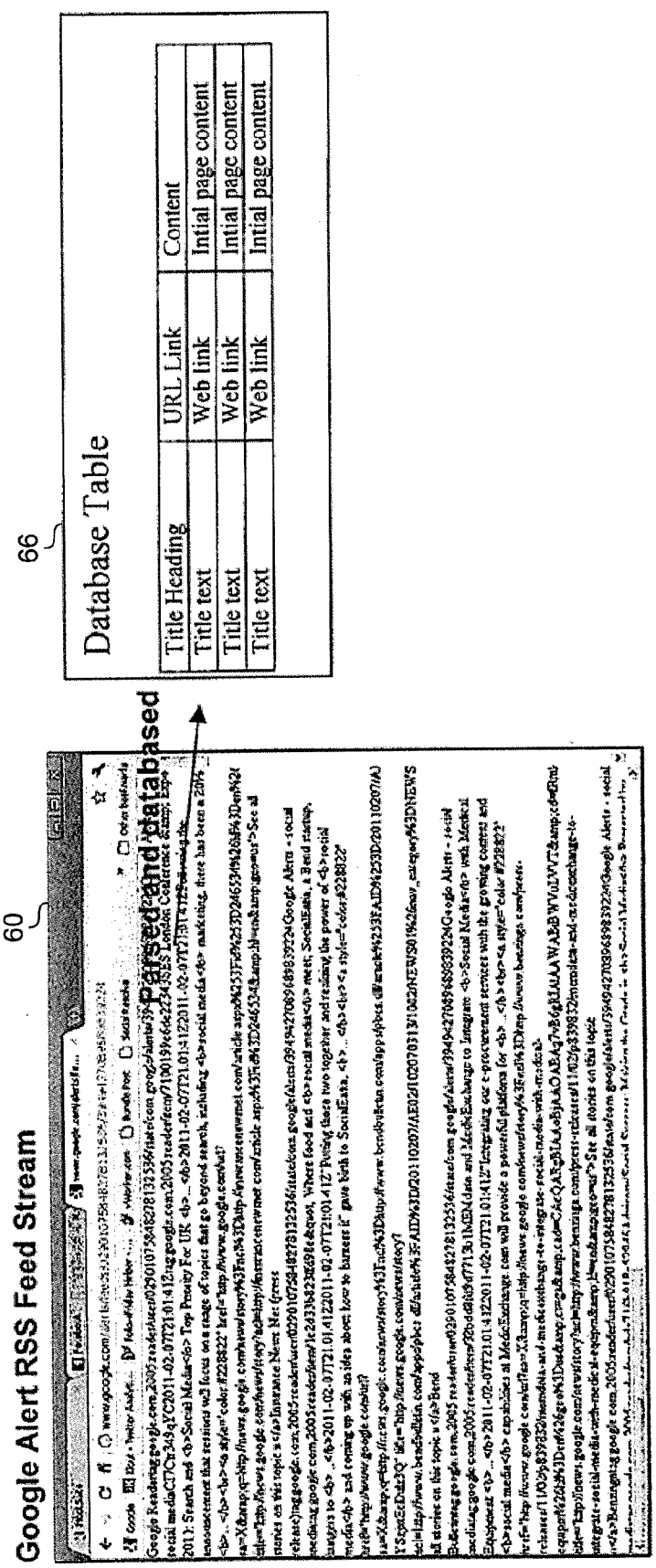
FIG. 16 is a screen print of an example RSS feed stream selected from a data feed like that of FIG. 2B, showing parsing of the feed content items into a database table.

FIG. 16 is a screen print of an example RSS feed stream selected from a data feed 60 like that of FIG. 2B, showing parsing of the feed content items into three components in a database table 66.

Figure 17:
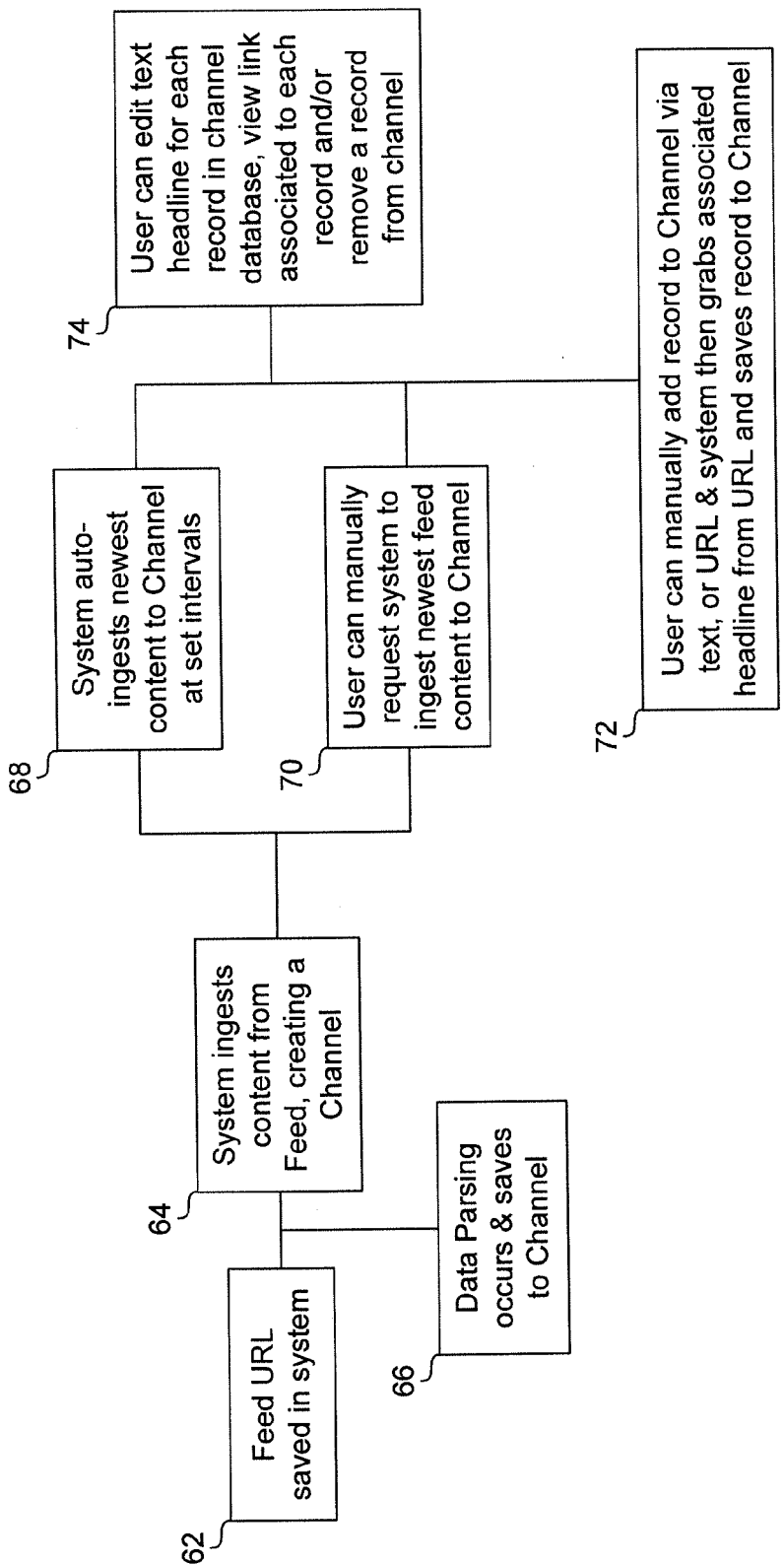
FIG. 17 is a flowchart of the process for capturing and organizing social media content from various sources for posting in an embodiment of the System of FIG. 1.

FIG. 17 is a flowchart of the overall process for capturing and organizing social media content from various sources for posting in an embodiment of the System of FIG. 1. The feed content items, such as the RSS feed stream 60 in FIG. 16, are stored at block 62. A feed channel is thereby created at block 64. The data in the incoming stream is parsed to create entries in the database table 66. The system auto-ingests the newest content at set intervals, block 68. In parallel, the user can manually request the system to ingest new content at any time, block 70. Also, via block 72, the user can manually add a record to the channel and save it. At block 74, the user can edit the components of each record, view the associated link, and/or remove a record from the channel.

Figure 18:
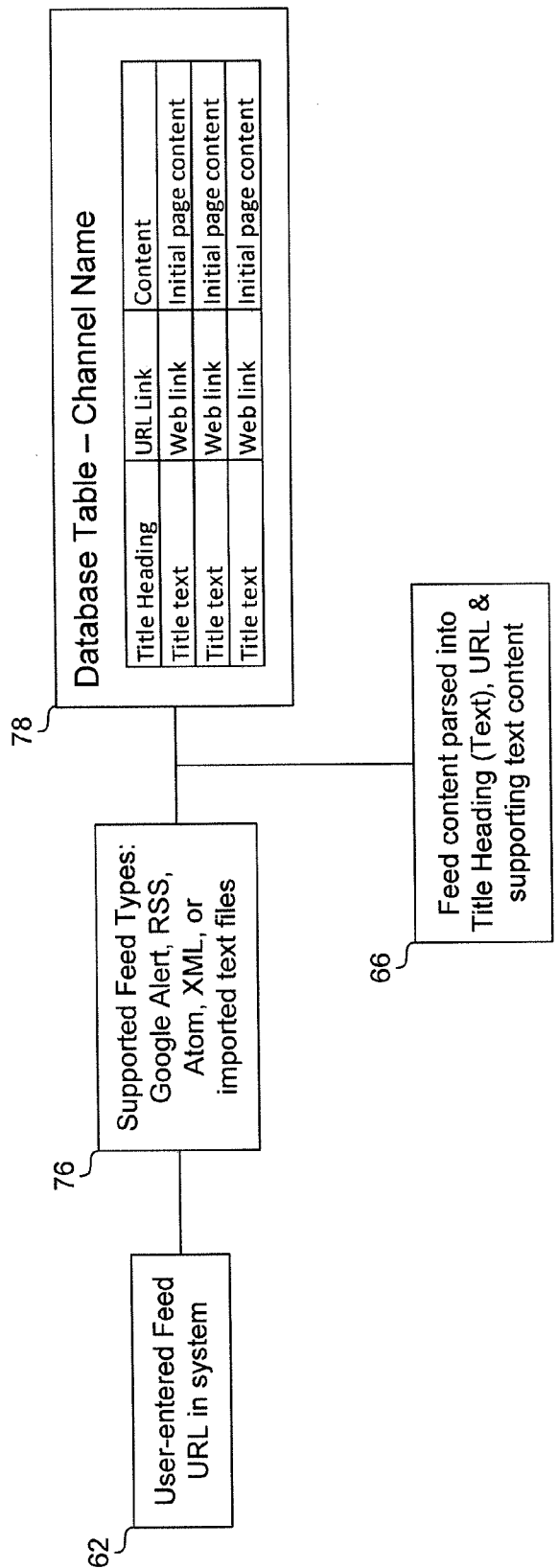
FIG. 18 is a flowchart of the process for capturing, parsing and storing data content feed items in a database table in an embodiment of the System of FIG. 1.

FIG. 18 is a flowchart of the process for capturing, parsing and storing data content feed items in a database table 78 in an embodiment of the System of FIG. 1. This method works with other Google Alert, RSS, Atom, XML feeds streams and/or upload of text/CSV and other file formats, see block 76.

The system uses multiple standard parsing techniques to receive feed data stream and break it into two or three components: 1) Text headline (the heading or article name) 2) The URL link to the associated the content and 3) The short provided content description associated with the URL *often the beginning of the article etc. This process is repeated for as many records exist in the desired ingested feed stream, resulting in a "channel" containing multiple records, preformatted and saved as social media posts/status updates. In some cases, such as email posts as in FIG. 2A, the feed content item may not include a URL, in which case the parsing method omits the URL link element from the database table 78.

The method databases these components as a single database record (see table 78) that is specifically formatted for posting any number of these records to various social network platforms, or as a comma separated value (CSV) export text file containing multiple posts that can be uploaded for posting using various Social Media Management Tools, such as HootSuite. The text headline of each specific record can be edited manually and the URL can be viewed to review the entire content the social media post is associated with.

Social Content Management System—A method and system designed to database preformatted social media posts for a person or company's proprietary content. This social content repository can include, but is not limited to a social media posts about a company's website, videos, fanpage, straight text and any other content a company would want to post inside the social graph.

The system has a method for databasing other social media content in the form of actual social media posts or status updates. Each post can have text content and a URL link, as well as a title or post name. Folders can be created and named and then contain any number of social content posts in each titled folder. This method can also be used to database and manage Twitter follow Friday (#FF) posts, mentioning certain Twitter accounts.

Figure 8:
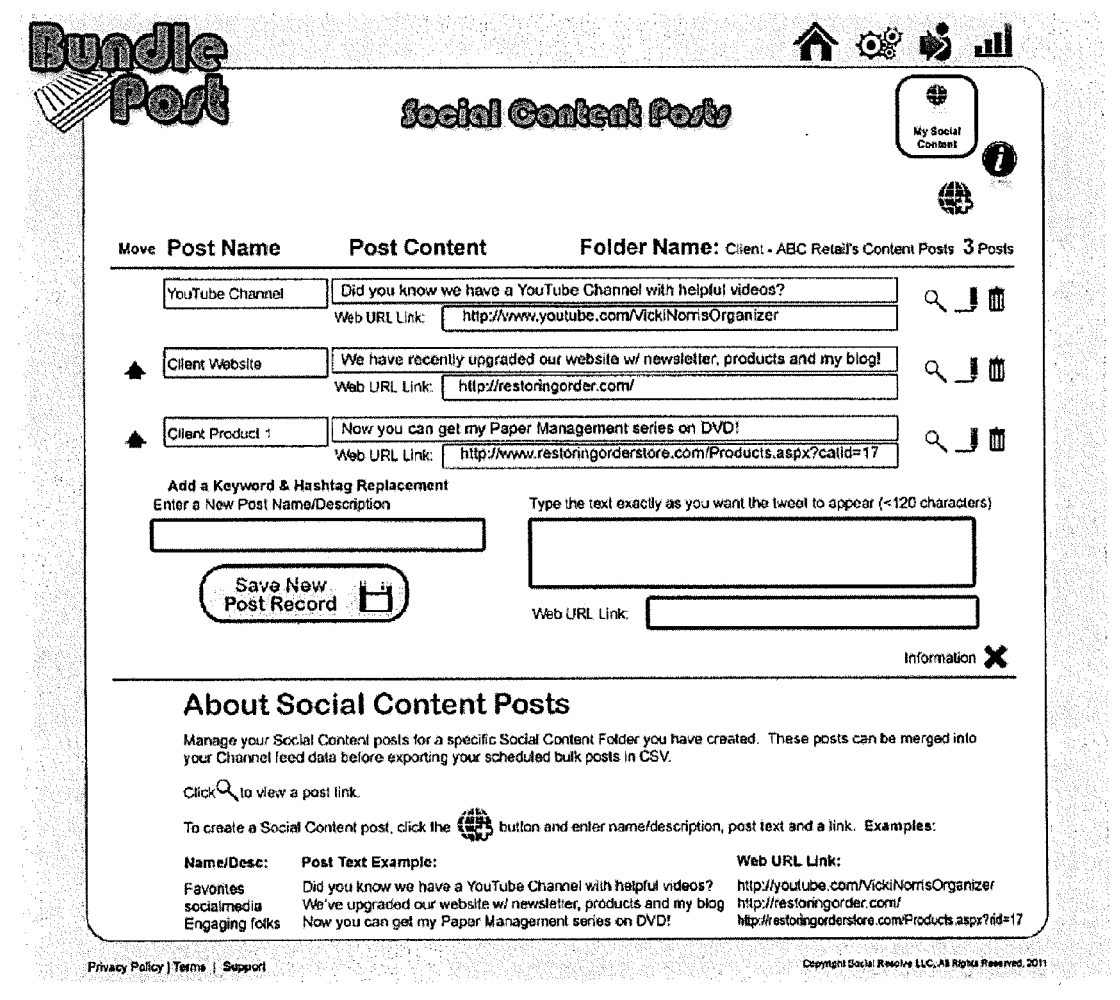
Figure 19:
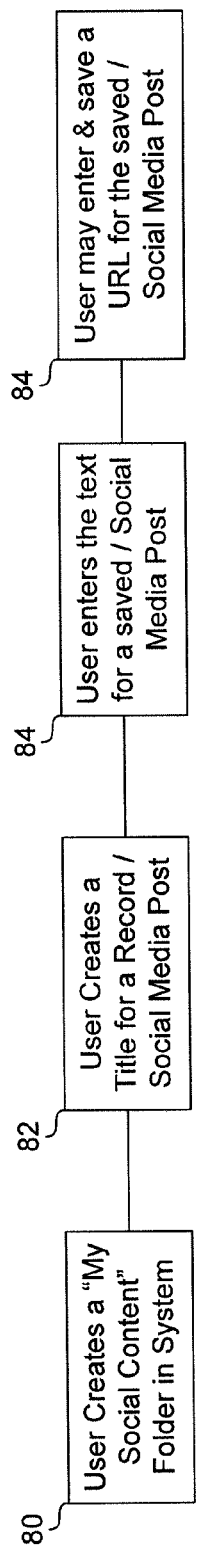
FIG. 19 is a flowchart of the process for creating the social content folder of FIG. 7 and social content posts in an embodiment of FIG. 8.

FIG. 19 is a flowchart of the process for creating the social content folder of FIG. 7 and social content posts in an embodiment of FIG. 8. Starting at tab 44 in FIG. 3, the user creates a My Social Content folder, block 80. The user creates a title for the record, block 82, and then enters the text the post to be stored, block 84. Optionally, the user can enter and save a URL for the saved post, block 84.

FIGS. 20A and 20B are examples of management tables used for assembling social media posts from social media content data feeds. FIG. 20A shows an example of a management table used for RSS feeds or the like that include a URL. FIG. 20B shows an example of a management table used for Follow Friday posts.

Automated text content hashtags—System that allows user to database keywords or phrases and assign replacement hashtag text that will automatically search the text content of databased social media posts and replace them with desired Twitter Hashtags.

The system enables a method that allows a user to create and name folders for Hashtag text content. Once a folder is created and named, any number of keywords can be added and a replacement hashtag can be assigned. The system allows a user to select a created hashtag folder and request it to run a search of the text in all social media posts within the database. Based on the keywords/phrases found within the desired hashtag folder, the system will find and replace each desired keyword/phrase within a specified table of content within the system with the associated hashtag from that folder.

Figure 21:
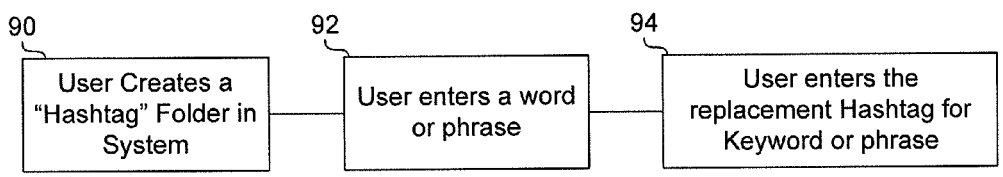
FIG. 21 is a flowchart of the process for creating the hashtag folder and hashtag list of FIGS. 9 and 10.

FIG. 21 is a flowchart of the process for creating the hashtag folder and hashtag list of FIGS. 9 and 10. The user creates a hashtag folder, block 90, then enters a word or phrase to be hashtagged, block 92. Then the user enters a replacement hashtag, block 94, thereby populating the hashtag table 96.

Figure 22:
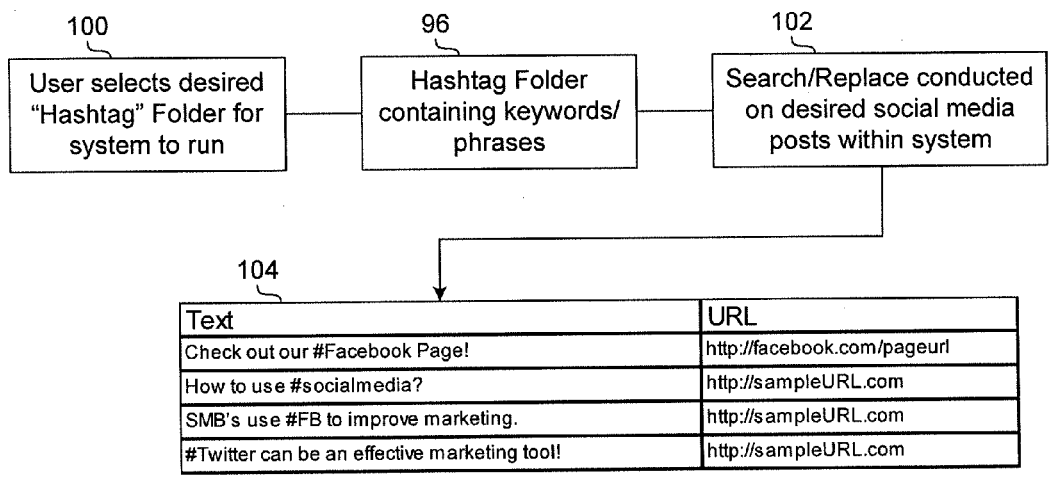
FIG. 22 is a flowchart of the process for using the hashtag folder and hashtag list of FIG. 21 to search and replace hashtagged terms in desired social media posts.

FIG. 22 is a flowchart of the process for using the hashtag folder and list of FIG. 21 to search and replace hashtagged terms in desired social media posts. The user selects the desired hashtag folder via the screen at FIG. 9, block 100. This selection brings up the folder 96, and a search/replace function in block 102 substitutes the hashtags for the corresponding terms of phrases in the export file 104.

A system and method for managing, arranging, group and exporting social media content for posting to social networks. The method allows a user to select social media content that has been previously entered and/or otherwise aggregated into various tables within a database, having been pre-formatted for posting to social networks.

Figure 23:
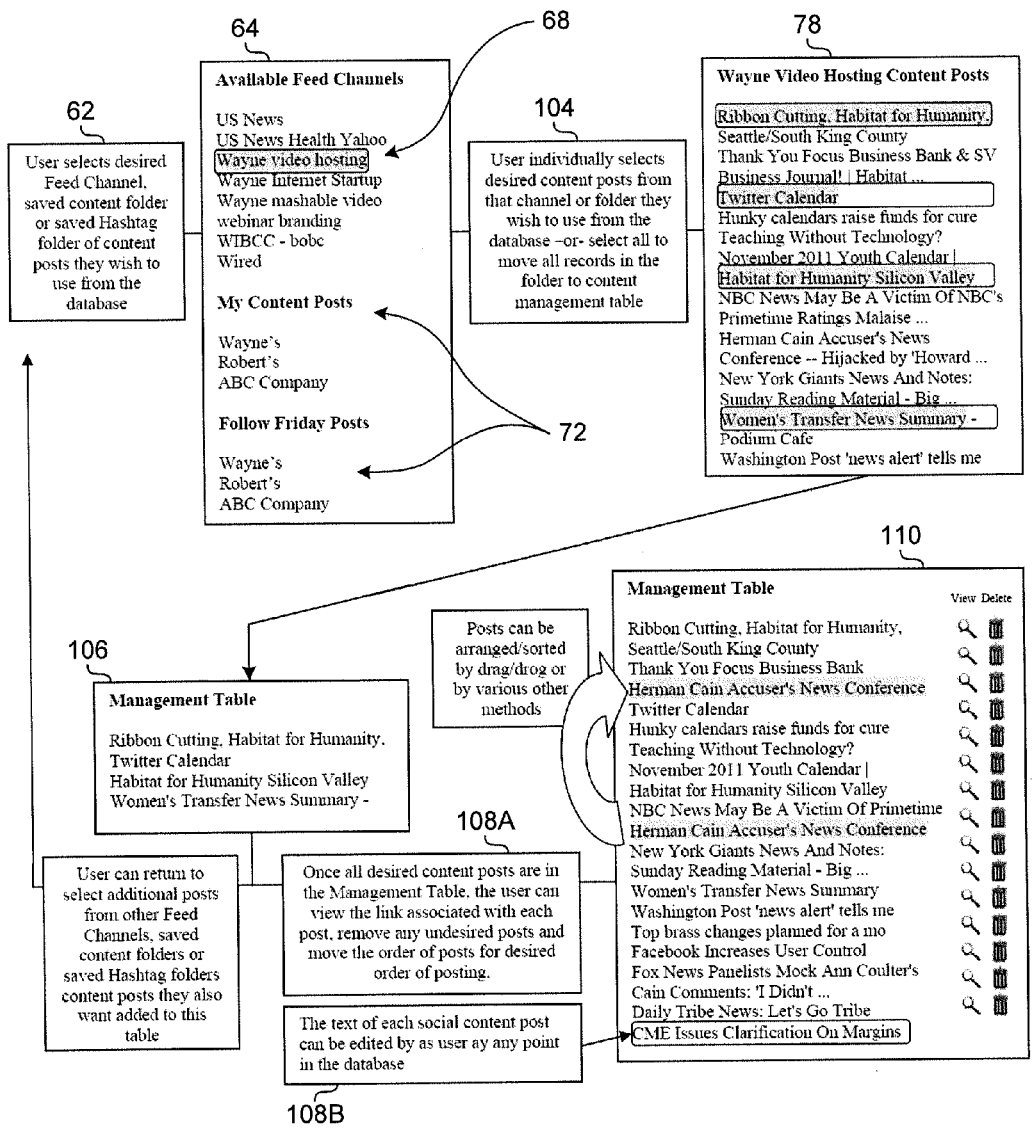
FIG. 23 is a flowchart of the overall process for creating and populating a management table of social media posts from feed channel content in an embodiment of the System of FIG. 1.

FIG. 23 is a flowchart of the overall process for creating and populating a management table of social media posts from feed channel content in an embodiment of the System of FIG. 1.

From a system that contains multiple feed channels 64, 68 and saved social media posts 72, a user can select content from the multiple sources within the database 78 to include, view, edit and arrange the content posts they wish to distribute to various social networks. The selected posts are then placed in a preliminary form of management table 106, from which the user, at blocks 108A and 108B, can further edit, viewing links and changing the order of the posts to produce an edited management table 110.

A system and method for merging databased social media content posts with a preformatted time schedule, resulting in efficiently scheduling large amounts of social media posts. The method includes managing time slots and the creation of time slot lists, specifically for merging and posting social media content to social networks.

Figure 24A:
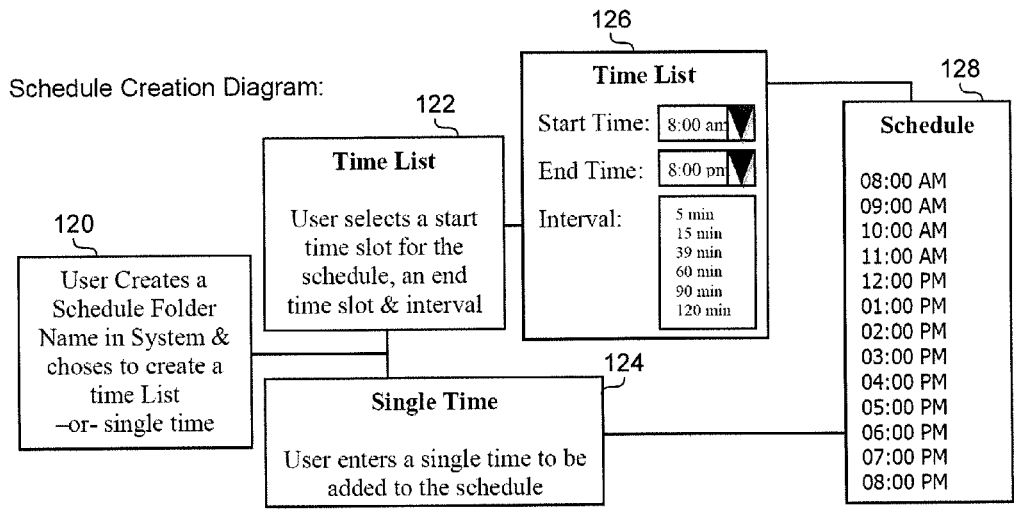
FIGS. 24A and 24B respectively are flowcharts of the processes for creating a schedule for social media posts and merging the schedule with the content in the management table of FIG. 23.
Figure 24B:
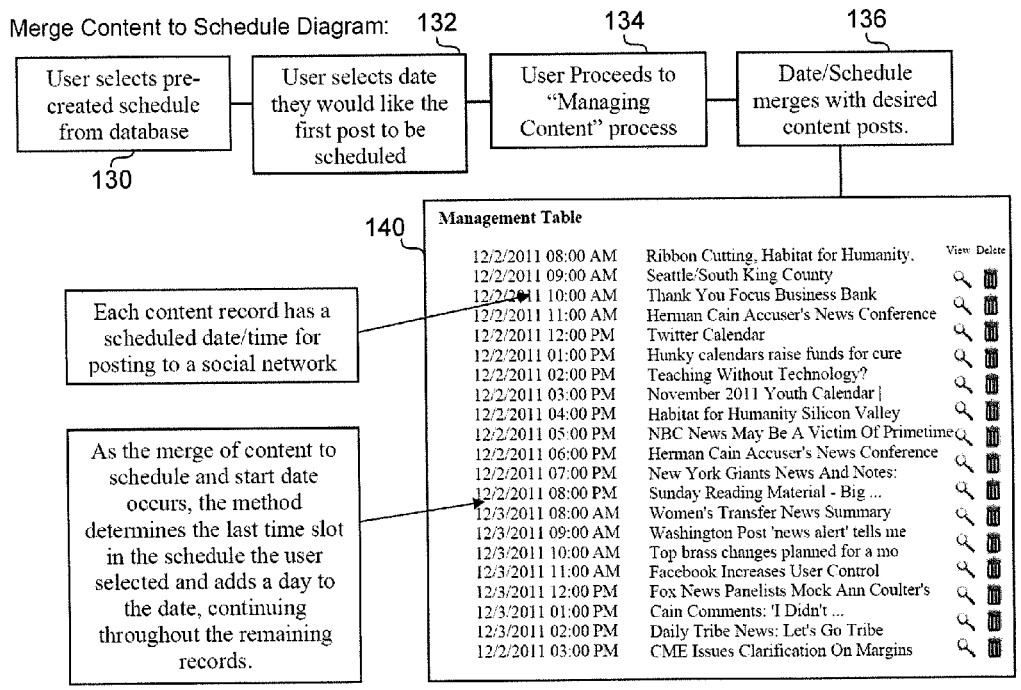

FIGS. 24A and 24B respectively are flowcharts of the processes for creating a schedule for social media posts, as shown in FIGS. 11 and 12, and for merging the schedule with the content in the edited management table 110 of FIG. 23.

In the process of FIG. 24A, users of the system create a schedule folder, block 120, and at block 122 assigns a starting date they wish posting to begin posting and the posting interval, e.g., 60 minutes. Then at block 126 the user selects a pre-created schedule 128 from the system containing a list of times of day that they desire content to be scheduled for posting to a social network. Alternatively or in addition, the user may enter a single time to be added to the schedule at block 124.

Once a user has their list of posts created and databased, the user can then merge the edited management table 110 with the schedule 128. In FIG. 24B, the user selects the desired schedule at block 130, then selects the date desired for the first posting at block 132. Next, the user proceeds to the managing content process at block 134 and in block 136 the date/schedule merges with the desired content posts to produce the scheduled management table 140 in which the posts are ordered in accordance with the scheduled dates and times. The user can also merge-or-infuse (also via drag n' drop) other databased social content in between those post records. All records can then merge with the preset schedule of times, for example, every hour daily from 8:00 am to 3:00 pm and the system will append those scheduled posting times in sequence from first post to last post based on the user-determined start date and time.

System and method for exporting scheduled social media content posts for uploading into third party social media management applications-or-scheduling directly from the database.

All formatted, edited, hashtagged and scheduled social media content post records can be exported from the management table for posting on various social networks. There are several ways the content posts can be used:
1) Export to a text file ready to be uploaded into a user's preferred social media management software (example HootSuite). Exported files can be downloaded into one of many formats, including but not limited to in text, CSV, Tab, XML or other accepted text file formats.
2) Transfer scheduled content posts directly to a third party social media management application via the application's available API.
3) Database the resulting file and post the content directly to the user specified social network via the network's available API.

Having described and illustrated the principles of the invention in various embodiments thereof, it should be apparent that the invention can be modified in arrangement and detail without departing from such principles. I claim all modifications and variations coming within the spirit and scope of the following claims.

The invention claimed is:
1. A social media content management system, comprising:
a computer having a memory and a communications interface for coupling to a social media network;
a database for storing files in the memory; and
execution instructions for assembling, managing, transforming and transmitting social media content;
the database including files for storing:
a feed content file;
a social content management file; and
management tables including a schedule file and an export content file;
the execution instructions including:
a feed channel content system including:
a subsystem for receiving a plurality of feed content items via the network and automatically storing the plurality of feed content items in the feed content file; and
a feed content parsing subsystem for automatically parsing each item of feed content into parsed feed content including at least two parts: a text headline and a Web link associated with each item for the feed content, for storage in the feed content file;
a management system including:
a selection subsystem for selecting parsed feed content items to be export content and automatically storing the export content as a plurality of social media posts in the social content management file; and
a scheduling subsystem for a user to create and store in the schedule file one or more schedules separate from the plurality of social media posts each comprising a plurality of posting times, to select a schedule and, to merge the selected schedule with the stored content in the management file to form automatically an instance of the export content file con- taining the plurality of social media posts, each associated with one of the posting times in the selected schedule; and an export system for transmitting the content items stored in the instance of the export content file as social media content posts to a social media network for posting according to the selected schedule.

2. A social media content management system according to claim 1 in which the database includes a social content repository for storing social media posts of a user's proprietary content from which the selection subsystem is operative for selecting social media posts as additional export content and storing the additional export content in the management file.

3. A social media content management system according to claim 1 in which the feed channel content system includes a feed content parsing subsystem for parsing each item of feed content into at least two parts: a text headline and a Web link associated with each item for the feed content.

4. A social media content management system according to claim 1 in which the feed content parsing subsystem is further operative for parsing the feed content to include a content excerpt in the parsed feed content.

5. A social media content management system according to claim 1 in which the selection subsystem is operable to select feed content items from the feed content file based on recency to add to the management file.

6. A social media content management system according to claim 1 in which the selection subsystem is operable for the user to manually select feed content items to add to the management file.

7. A social media content management system according to claim 1 in which the management system enables the user to edit one or more of the feed channel file, the management file, or each selected item of the feed content.

8. A social media content management system according to claim 1 in which the export system for transmitting the content items stored in the export content file is operable to transmit content items in one or more of the following formats: direct connection to third party social media management applications; an application program interface (API) connection to another API-functional application; or as a comma separated value (CSV) text file.

9. A social media content management system according to claim 1 in which the feed channel content system includes a feed content parsing subsystem for parsing each item of feed content into three parts: a text headline, a sample of content and a URL link associated with a web page for the feed content.

10. A social media content management process operable on a computer having a memory and a communications interface for coupling to a social media network to transform content selected from a received data feed and to republish the transformed content as social media content posts to the social media network, the process comprising:

receiving a content feed data stream including candidate feed content items for posting as social media content, the feed content items each including a URL link to associated content; and automatically parsing an item of the candidate feed content items into a candidate social media post comprising at least two parts: a text headline and the associated URL link for the feed content item;

automatically storing each candidate social media post in a feed content file;

selecting candidate social media posts from the feed content file and automatically storing the selected social media posts in a social content management file;

editing the text or URL of selected social media posts in the social content management file;

providing a schedule containing a plurality of times for posting the social media content to a social media network;

merging the schedule with the stored content in the social content management file to form an export content file; and automatically transmitting the selected social media posts stored in the export content file as social media content posts to a social media network according to the schedule.

11. A social media content management process according to claim 10, including storing social media posts of a user's proprietary content in a social content repository, selecting social media posts from the social content repository as additional export content, and storing the additional export content in the social content management file.

12. A social media content management process according to claim 10, in which parsing an item of the candidate feed content items into a candidate social media post further includes parsing the feed content of the item into a content excerpt.

13. A social media content management process according to claim 10, in which selecting candidate social media posts from the feed content file to add to the social content management file is based on recency.

14. A social media content management process according to claim 10, in which selecting candidate social media posts includes the user manually selecting feed content items to add to the social content management file.

15. A social media content management process according to claim 10 in which the user edits one or more of the feed channel file, the social content management file, or a selected item of the feed content.

16. A social media content management process according to claim 10, in which the feed content includes an RSS data feed.

17. A social media content management system according to claim 1 in which the social content management file comprises:

a table of unique dates and times associated one-to-one with a table of content text headlines for a series of transmissions of content items associated with the content text headlines to the social media network;

the unique dates and times including a beginning date and time for commencement of the series of transmissions; and a table for storing in association with each content item includes a URL link associated with a web page for the content item.

18. A social media content management system according to claim 17 in which at least one of the content items includes a hashtag automatically input by the system.

19. Social media content management system according to claim 17 in which each content item further includes a content excerpt.

* * * * *